United States Patent [19]
DiMartino, Sr. et al.

[11] Patent Number: 4,857,082
[45] Date of Patent: Aug. 15, 1989

[54] MEMBRANE UNIT TURN-DOWN CONTROL SYSTEM

[75] Inventors: Stephen P. DiMartino, Sr., Topton; Jeffrey A. Hopkins, Whitehall; Ruth A. Davis, Allentown, all of Pa.

[73] Assignee: Air Products and Chemicals, Inc., Allentown, Pa.

[21] Appl. No.: 244,769

[22] Filed: Sep. 15, 1988

[51] Int. Cl.[4] .......................................... B01D 53/22
[52] U.S. Cl. .......................................... 55/16; 55/21; 55/68; 55/158; 55/218; 55/270
[58] Field of Search ................. 55/16, 18, 21, 68, 158, 55/212, 218, 270, 274

[56] References Cited

U.S. PATENT DOCUMENTS

| | | | |
|---|---|---|---|
| 3,975,170 | 8/1976 | Keating, Jr. | 55/16 |
| 3,979,190 | 9/1976 | Hedman | 55/16 X |
| 4,040,801 | 8/1977 | Dyer et al. | 55/16 |
| 4,397,661 | 8/1983 | King et al. | 55/158 |
| 4,421,529 | 12/1983 | Revak et al. | 55/21 X |
| 4,537,606 | 8/1985 | Itoh et al. | 55/158 |
| 4,553,988 | 11/1985 | Shimizu et al. | 55/158 |

FOREIGN PATENT DOCUMENTS

| | | | |
|---|---|---|---|
| 51469 | 5/1982 | European Pat. Off. | 55/16 |
| 2841760 | 4/1979 | Fed. Rep. of Germany | 55/16 |
| 13329 | 3/1982 | Japan | 55/21 |
| 60-011205 | 1/1985 | Japan | 55/158 |
| 60-011206 | 1/1985 | Japan | 55/158 |
| 62-191404 | 8/1987 | Japan | 55/158 |
| 63-123421 | 5/1988 | Japan | 55/158 |
| 63-123422 | 5/1988 | Japan | 55/158 |

*Primary Examiner*—Robert Spitzer
*Attorney, Agent, or Firm*—Mark L. Rodgers; William F. Marsh; James C. Simmons

[57] ABSTRACT

A permeator system for separating at least one gaseous component from a feed gas mixture containing at least one other component using a semi-permeable membrane is disclosed which maintains high permeate product purity and desired component recovery during periods of turn-down in capacity. In accordance with the present invention, the permeator system contains a series of flow and pressure sensors and valves which regulate differential pressure across the membrane based upon permeate product demand or feed availability.

22 Claims, 3 Drawing Sheets

MEMBRANE UNIT TURN-DOWN CONTROL SYSTEM

TECHNICAL FIELD

The present invention relates to control systems and methods for turning down the capacity of a membrane unit.

BACKGROUND OF THE INVENTION

Most gas separation processes do not normally operate at their maximum or nameplate capacity but at some lower capacities due to upstream or downstream conditions. In addition, there is usually a turn-down requirement, i.e., the plant must be capable of running in a range of set points lower than full rate and full rate. Additionally, the plant must also meet other external requirements such as product recovery, product purity, energy requirements, and the like. In most gas process facilities, turn-down requirements are not a problem and can be designed into the plant as the optimum ranges of the equipment are fairly broad and well known and suitable control strategies have been developed. However, in membrane-biased gas processing plants, this is not the case. Membrane units have fairly low turn-down capabilities, i.e., typically from 100% to about 75% of full flow, without sacrificing some other requirement such as product purity. This is due to the fact that as the flow rate decreases, the area per unit flow increases. Since permeation of a gas through a membrane is proportional to the area and the partial pressure difference across the membrane, as the area per unit flow increases, the partial pressure of the non-desired species in the permeated product increases on the feed side forcing more of the gas through the membrane to the permeate side, thereby increasing its concentration on the downstream side. Consequently, as the feed flow to the unit decreases, the product purity also decreases.

Several methods have been developed in an attempt to allow for the turn-down of a membrane system without large sacrifices in product purity. One such method involves removing membrane area by automatically valving off a portion of the membrane modules at predetermined production levels. Such a system which operates by removing membrane area during turn-down of the system is described in U.S. Pat. No. 4,397,661. This patent discloses a permeator system which comprises a plurality of permeator stages each of which receives a feed stream, and the flow of permeate from at least one permeator stage is initiated and terminated at predetermined rates of permeate fluid flow from the permeate system. While this system is said to accomplish turn-down of the unit without sacrificing permeate purity, the system necessarily involves several smaller modular units in parallel, which results in a loss of economy of scale. Additionally, the need to block off membrane area requires additional valves, piping, instrumentation and the like which increases the complexity of the system, the size of the unit and also the capital cost. Step-wise turn-down of these systems also causes discontinuities in performance as a membrane module is valved out, which is generally undesirable in chemical plants because it causes a change in other processing units both upstream and downstream.

A second method which has been used to improve the purity of the permeate stream during turn-down is to raise the permeate pressure. This decreases the flux across the membrane of the lower permeability components faster than the higher permeability; i.e., product, components. By this method product purity is increased, however, such an increase is achieved at the expanse of reduced product recovery. In fact, a significant product recovery decrease is observed as the production rate approaches 80%, and is reduced to the point of being ineffective as the production rate approaches 60%. Consequently, conventional permeate pressure adjustment processes are applicable only as a "fine tuning" control mechanism and are not applicable as a turn-down mechanism, especially as the feed flow decreases as the permeate increases at a fixed purity.

BRIEF SUMMARY OF THE INVENTION

The present invention is a permeator system for separating at least one gaseous component from a feed gas mixture containing at least one other component. The system comprises a membrane unit having at least one semi-permeable membrane which is selectively permeable toward at least one component in the feed gas mixture. A series of valves and controls are located around the membrane unit to effectively control differential pressure across the membrane unit to follow either changes in product demand or feed flow. A volumetric flow valve is located along a reject gas outlet to control the flow of reject; i.e., non-permeated gas, from the membrane unit. A flow controller is positioned along the reject gas outlet which measures the volumetric flow of gas through the outlet, and controls the volumetric flow valve to maintain the gas flow through said reject outlet at a substantially constant value. A permeate valve is located along a permeate gas outlet to regulate the permeate backpressure resulting from the permeate stream being removed from the membrane unit. A pressure controller is positioned along said permeate gas outlet to measure the pressure in said outlet and control the permeate valve to maintain a substantially constant permeate backpressure. Optionally, to follow product demand, a second pressure controller is positioned along said permeate gas outlet to measure the pressure in said outlet downstream of said permeate valve, and which controls the operation of a feed gas valve located along the feed gas inlet to regulate the flow of feed gas into the membrane unit. Alternatively, to follow feed flow changes, the feed gas valve may be regulated to provide backpressure control.

In one embodiment of the present invention, one or more membrane units each having a plurality of semi-permeable membranes or elements, several of which are connected via a first permeate tube with the remainder connected via a second permeate tube, can be employed. Each permeate tube is connected to a separate permeate header. Each permeate header is independently valved thereby allowing permeate flow from one of the groups of elements to be blocked during turn-down conditions, while still keeping the membrane unit on-line.

The present permeator system design allows for the system to be turned down in capacity with a much lower permeate purity reduction and higher permeate recover than can be achieved with conventional systems.

BRIEF DESCRIPTION OF THE DRAWINGS

The drawing of FIG. 1 is a schematic diagram of a permeator system of the present invention having a single permeate outlet.

The drawing of FIG. 2 is a schematic diagram of a permeator system of the present invention having several semi-permeable membranes arranged such that some use a first permeator outlet and the remainder use a second permeate outlet, with said permeator outlets being independently valved.

Figure 3:
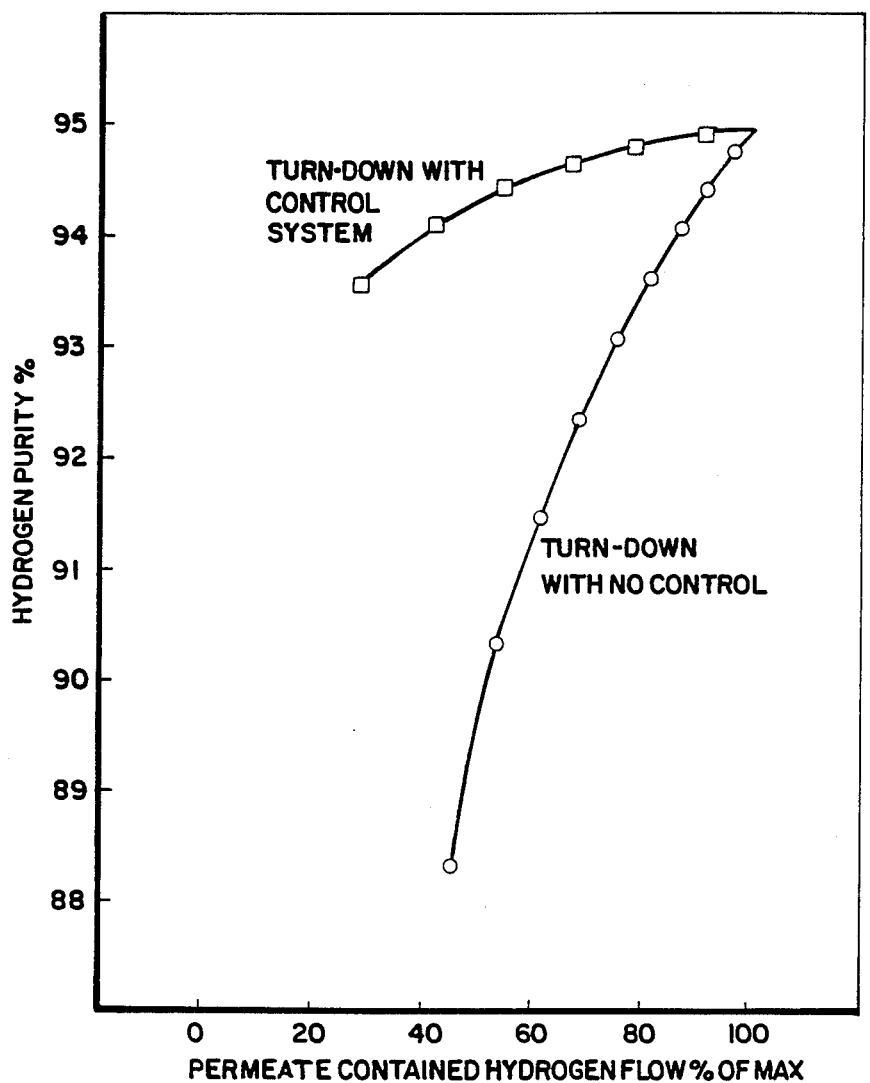

The drawing of FIG. 3 is a graph of the relationship between permeate hydrogen flow and permeate hydrogen purity for both a permeator system with no turn-down control, and a system in accordance with the present invention, for a multi-component gas system with hydrogen as the most permeable component.

DETAILED DESCRIPTION OF THE INVENTION

The present invention is a control system and method for turning down a membrane unit without causing discontinuities in feed flow or large reductions in permeate product purity when turn-down steps are made. The present invention is particularly adaptable to processes where the permeate gas is the desired product and the residual or non-permeate stream is of lesser or no value. It especially applies to cases where the residual stream is, after passing through the membrane, reduced in pressure for further processing. One such example is a process for recovering hydrogen from a refinery offgas stream wherein the residual stream is reduced in pressure and sent to fuel after membrane processing for hydrogen recovery. Examples of other applications for which the present invention is well suited include hydrogen recovery from ammonia purge gas, hydrogen recovery from hydrotreater purge gas, hydrogen recovery from hydrocracker purge gas, helium recovery from crude helium streams, and other such processes.

Figure 1:
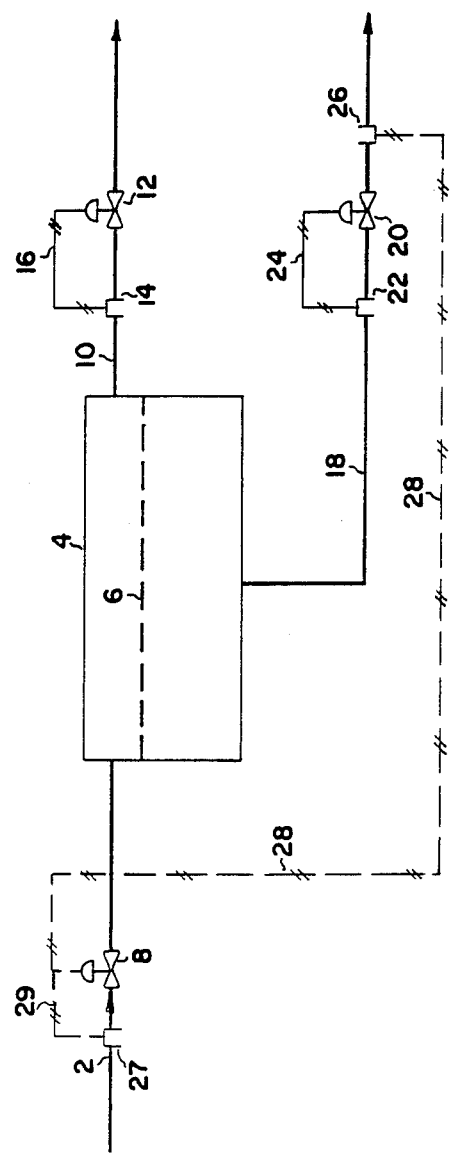

The permeator system of the present invention employs a series of flow and pressure sensors and valves which regulate membrane permeate pressure, membrane residual volumetric flow and optionally feed gas flow or backpressure based upon permeate product demand or demands of upstream processes, respectively. One embodiment of the present permeator system is illustrated by the drawing of FIG. 1. Referring to this drawing, a feed gas mixture passes through a feed gas inlet 2 into a membrane unit 4 containing at least 1 semi-permeable membrane 6 which is more permeable to one component in said feed gas mixture than to at least one other component. The feed gas inlet 2 is positioned such that feed gas entering the membrane unit 4 contacts one side of the semi-permeable membrane, i.e., reject side, allowing a portion of the mixture to permeate through the membrane to the permeate side. A feed gas valve 8 is positioned along said feed gas inlet 2 to control the flow of feed gas entering the membrane unit 4 or alternatively, to control the feed backpressure, although in some embodiments a feed gas valve is not required. A reject gas outlet 10 in fluid communication with the membrane unit 4 is positioned such that gas which does not permeate through said semi-permeable membrane 6 can be removed via this outlet 10. A volumetric flow valve 12 is positioned along said reject gas outlet 10 to control the flow of residual gas from the membrane unit 4. A flow controller 14 is positioned along said reject gas outlet 10 which measures the volumetric flow of gas through said reject gas outlet 10 and controls said volumetric flow valve 12 to regulate the volumetric flow of gas through said outlet 10. The flow controller 14 controls said valve 12 to maintain the residual gas flow through said reject outlet 10 at a substantially constant valve. This causes the feed side pressure to increase or decrease depending upon the permeate flow, with higher permeate flow requiring higher feed side pressure. The flow controller 14 can control the volumetric flow valve 12 by any suitable method, such as by sending an electronic signal or impulse 16 which automatically opens or closes the valve 12.

A permeate gas outlet 18 in fluid communication with the membrane unit 4 is positioned such that the portion of said feed gas which permeates through the semi-permeable membrane 6 can be removed from the membrane unit 4. A permeate valve 20 is positioned along the permeate gas outlet 18 to control the permeate backpressure. A pressure controller 22 is positioned along said permeate gas outlet 18 which measures the pressure in the permeate gas outlet 18 upstream of said permeate valve 20 to control said valve 20. As permeate flow increases or decreases due to higher or lower feed flow respectively, the pressure upstream of valve 20 increases or decreases accordingly. The pressure is sensed by the pressure controller 22 which, by any suitable method such as by electrical impulse 24, causes the permeate valve 20 to open or close to maintain a substantially constant permeate backpressure.

As the downstream demand for the permeate gas increases or decreases the pressure in the permeate gas outlet 18 downstream of the permeate valve 20 decreases or increases accordingly. In embodiment in which gas flow the membrane is regulated based upon permeate demand, the pressure in this portion of the permeate gas outlet 18 is sensed by a second pressure controller 26 positioned along said outlet 18 which controls, via an electrical impulse 28 or other suitable method, the feed gas valve 8 positioned along the feed gas inlet 2 such that said valve 8 opens when the pressure in this portion of the outlet 18 decreases, and closes when said pressure increases, thus controlling the feed flow in accordance with permeate product demand.

In another embodiment wherein the feed backpressure is to be held substantially constant, a pressure sensor 27 located along the feed gas inlet 2 upstream from the feed gas valve 8, can control said valve 8, via electrical impulse 29 or some other means, to maintain a constant feed back pressure. It should be realized that the critical components of the present invention are the volumetric flow valve 12 and flow controller 14 which maintain a constant residual gas flow, and also the permeate valve 20 and pressure controller 22 which maintain a constant permeate backpressure. All other valves and control mechanism are optional and represent various embodiment of the present invention.

Figure 2:
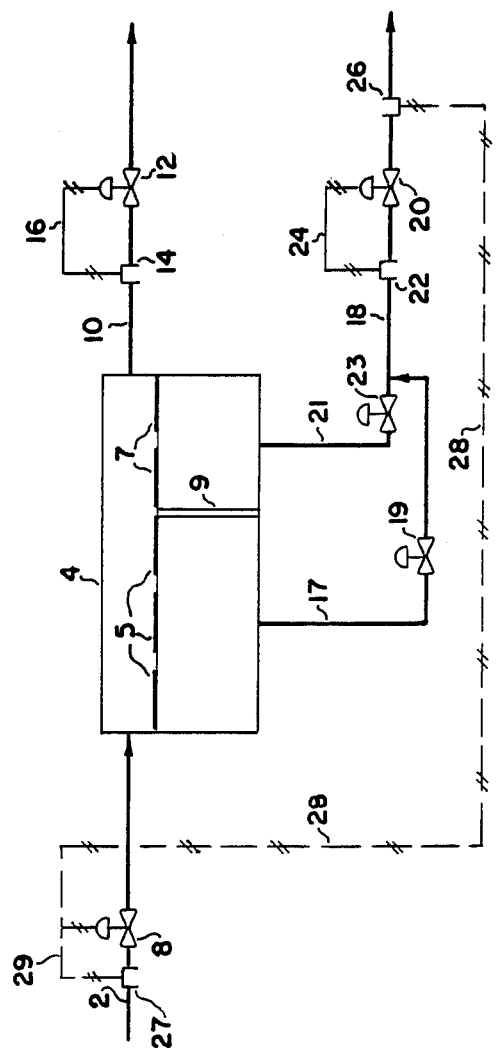

The drawing of FIG. 2 illustrates an embodiment of the present invention wherein the membrane unit 4 contains a plurality of semi-permeable membranes in the form of separate membrane elements. One group of membrane elements 5 are connected via a common permeate tube and header configuration 17. A second group of membrane elements 7 are connected to a second, separate permeate tube and header configuration 21. The permeate tube and header configurations 17 and 21 are separated by some type of blocking means 9 and are independently valved by valves 19 and 23 respectively. This allows for the permeate flow from either group of elements, 5 or 7, to be blocked during periods of turn-down. This embodiment allows for turn-down to as low as 15% of design rates while maintaining permeate product purity and recovery within typically acceptable ranges. Additionally, all membrane elements are on-line throughout the entire turn-down feed flow range and therefore elements do not need to be put in and out of service with variations in flow. This eliminates manual isolation, depressurization and purge operations and also protects the membrane from frequent repressurization and restart operations. As illustrated in the drawing of FIG. 2, this dual permeate-header configuration can be, and is preferably, used in conjunction with the control system illustrated by the drawing of FIG. 1, although either control system may be used independently of the other.

The turn-down control systems described above are adopted for a wide range of separations and types of membranes and membrane elements for example, hollow fiber, spiral wound flat sheets, and the like. Additionally, the number of membrane units, membrane elements, inlets, outlets and the like, either in series or parallel, are not critical and are all meant to be covered by the scope of this invention.

The following examples are presented to illustrate the present invention and are not meant to be limiting.

EXAMPLE 1

Calculations were carried out to determine the hydrogen permeate product purity achieved at various production rates during turn-down of a typical permeator system designed to give 95.14% hydrogen purity and 75.46% hydrogen recovery at capacity; i.e., 100% of flow. The calculations were carried out for both a conventional permeator system without a turn-down control and also for a permeator employing the control system set out in FIG. 1. The feed composition used was hydrocracker offgas having the following composition:

| Feed composition (mole %) | |
|---|---|
| $H_2$ | 74.90 |
| $CO_2$ | 2.51 |
| $O_2$ | 1.00 |
| CO | 1.50 |
| $CH_4$ | 7.52 |
| $N_2$ | 7.77 |
| $C_2H_6$ | 1.00 |
| $C_3H_8$ | 3.00 |
| $C_4H_{10}$ | 0.30 |
| $C_5H_{10}$ | 0.30 |

The results for both systems are illustrated in the graph of FIG. 3. From this graph it can be seen that when the flow to a unit without a control system is turned-down the permeate product purity deteriorates rapidly. For example, permeate product purity was calculated to be about 95% at 100% flow, and only 88.6% at 45% flow. Further calculations not shown on the graph indicate that permeate purity is below 80% at 20% flow. Conversely, however, a similar permeator system employing the control system of the present invention maintained much higher permeate purities during turn-down. Specifically, such a system had a hydrogen permeate purity of 95% at 100% flow and 93.2% purity at 27% flow. Accordingly, it can be seen that the present system allows for significantly higher purity product at turn-down levels, and therefore the minimum flow required to achieve a minimum level of product purity is much less than in systems without this control mechanism.

EXAMPLE 2

A permeator system with a turn-down control as illustrated in the drawing of FIG. 2 was developed. The actual system contained a plurality of membrane units in the form of pressure tube housings, each having a plurality of spiral wound elements. Each element in the pressure tube housing was connected at its permeate tube. Permeate from several elements were isolated by a dual permeate design thereby allowing for a reduction in membrane area by valve each separate permeate header, thereby blocking permeate flow from a group of elements. The system was used for recovering hydrogen from hydrocracker offgas, over a turn-down range from full capacity, i.e., 100% flow to 20% flow. Improved hydrogen recovery was measured over the turn-down range while maintaining a hydrogen permeate product purity in the range of 93–95%. It was found that the turn-down system design of the present invention as set out in the drawing of FIG. 2, provides for both high hydrogen product purity and recovery over a large turn-down feed flow range.

Having thus described the present invention, what is now deemed appropriate for Letters Patent is set out in the following appended claims.

What is claimed is:

1. In a process for separating a component of feed gas mixture containing at least one other component by passing said feed gas to a membrane unit containing a semi-permeable membrane such that one component is separated by preferential permeation through said membrane and is subsequently removed or recovered from the membrane unit as permeate product through a permeate gas outlet while non-permeating components are removed as residual gas through a reject gas outlet, the improvement for maintaining high permeate product purity during periods of turn-down in feed flow capacity which comprises:
   (a) maintaining a substantially constant permeate backpressure in said permeate gas outlet; and
   (b) maintaining the flow of residual gas through said reject gas outlet at a substantially constant value.

2. A process in accordance with claim 1 wherein said feed gas mixture is selected from the group consisting of: ammonia purge gas, hydrotreater purge gas, hydrocracker purge gas and a crude helium stream.

3. A process in accordance with claim 1 wherein said permeate product is hydrogen.

4. A process in accordance with claim 1 wherein said permeate backpressure in said permeate gas outlet is held substantially constant by a valve positioned along said permeate gas outlet which valve is controlled by a pressure controller which measures said permeate backpressure.

5. A process in accordance with claim 4 wherein the flow of residual gas through the reject gas outlet is held substantially constant by a valve positioned along said reject gas outlet which valve is controlled by a flow controller which measures the volumetric flow of gas through said reject gas outlet.

6. A process in accordance with claim 5 wherein the flow of feed gas to the membrane unit is regulated by a valve positioned along a feed gas inlet, said valve being controlled by a pressure controller positioned along said permeate gas outlet downstream of said valve positioned along the permeate gas outlet.

7. A process in accordance with claim 1 which further comprises regulating the flow of feed gas to the membrane unit to maintain a substantially constant ratio of permeate product demand to feed gas supplied.

8. A permeator system for separating at least one gaseous component from a feed gas mixture containing at least one other component, said system comprising:
   a membrane unit comprising at least one semi-permeable membrane which is more permeable to one component in said feed gas mixture than to at least one other component, said semi-permeable membrane having a reject side and a permeate side;
   a feed inlet in fluid communication with the membrane unit, positioned such that said feed gas mixture can be passed through said feed inlet to contact the reject side of said semi-permeable membrane;
   a reject gas outlet in fluid communication with said membrane unit positioned such that gas which does not permeate through the semi-permeable membrane can be removed from the membrane unit via said reject gas outlet;
   a volumetric flow valve positioned along said reject gas outlet to control the flow of reject gas through said reject gas outlet;
   a flow controller positioned along said reject gas outlet which measures the volumetric flow of gas through said reject gas outlet, and controls said volumetric flow valve to regulate the gas flow through said reject gas outlet;
   a permeate gas outlet in fluid communication with the membrane unit, positioned such that the portion of said feed gas which permeates through the semi-permeable membrane can be removed form the membrane unit;
   a permeate valve means, positioned along said permeate gas outlet to control permeate backpressure and;
   a pressure controller positioned along said permeate gas outlet which measures the pressure in the permeate gas outlet upstream of said permeate valve means, and controls said permeate valve means.

9. A permeator system in accordance with claim 8 which further comprises a feed gas valve positioned along said feed gas inlet to control the flow of feed gas entering the membrane unit.

10. A permeator system in accordance with claim 9 which further comprises:
   a second pressure controller, positioned along said permeate gas outlet which measures the pressure in said permeate gas outlet downstream of said permeate valve means, and which controls the operation of said feed gas valve positioned along said feed inlet to control the flow of feed gas entering the membrane unit.

11. A permeator system in accordance with claim 10 wherein said second pressure controller controls said feed gas valve positioned along the feed inlet by use of an electronic signal.

12. A permeator system in accordance with claim 9 which further comprises a pressure controller positioned along the feed gas inlet which measures the feed backpressure and which controls the operation of the feed gas valve to maintain a constant feed backpressure.

13. A permeator system in accordance with claim 9 wherein said flow controller positioned along said reject gas outlet also controls the operation of the feed gas valve to regulate the flow of gas entering the membrane unit.

14. A permeator system in accordance with claim 8 wherein said membrane unit is a pressure tube housing.

15. A permeator system in accordance with claim 14 wherein said pressure tube housing contains a plurality of semi-permeable membrane elements.

16. A permeator system in accordance with claim 8 wherein said membrane unit contains a plurality of semi-permeable membrane elements.

17. A permeator system in accordance with claim 16 wherein said plurality of semi-permeable membrane elements are designed such that several elements are connected via a common permeate tube and header with the remaining elements connected via a second, independent permeate tube and header.

18. A permeator system in accordance with claim 17 wherein each permeate header is independently valved.

19. A permeator system in accordance with claim 8 wherein said flow controller controls said volumetric flow valve by use of an electronic signal.

20. A perimeter system in accordance with claim 8 wherein said pressure controller positioned along said permeate gas outlet controls said permeate valve by use of an electronic signal.

21. A permeator system in accordance with claim 8 which comprises a plurality of membrane units.

22. A permeator system in accordance with claim 21 wherein each membrane unit contains a plurality of semi-permeable membrane elements.

* * * * *